J. WEINBERG.
WHEEL TIRE.
APPLICATION FILED FEB. 27, 1917.

1,235,264.

Patented July 31, 1917.

INVENTOR.
Joseph Weinberg
BY S. Geo. Stevens
ATTORNEY.

UNITED STATES PATENT OFFICE.

JOSEPH WEINBERG, OF DULUTH, MINNESOTA.

WHEEL-TIRE.

1,235,264.   Specification of Letters Patent.   Patented July 31, 1917.

Application filed February 27, 1917. Serial No. 151,157.

*To all whom it may concern:*

Be it known that I, JOSEPH WEINBERG, a subject of the Czar of Russia, residing at Duluth, in the county of St. Louis and State of Minnesota, have invented certain new and useful Improvements in Wheel-Tires, of which the following is a specification, reference being had therein to the accompanying drawing.

This invention relates to wheel tires and has special reference to resilient spring tires for use on self propelled vehicles, such as automobiles and the like.

The object is to produce a simple resilient tire of this character having certain novel features heretofore unknown in the art and one that may be assembled or taken apart with the least possible effort.

Other objects and advantages will appear in the further description of the invention.

In the accompanying drawings forming part of this application and in which like reference characters indicate like parts:

Figure 1:
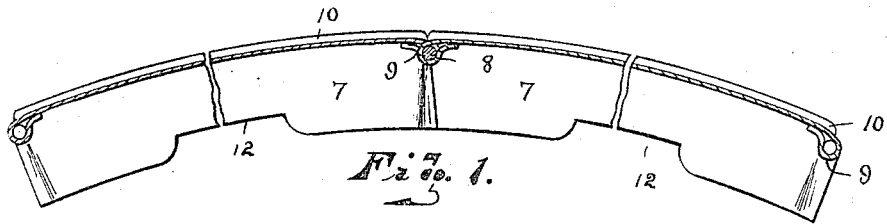
Figure 1 is a broken vertical sectional view through two of the hinged yieldable tire tread sections.
Figure 2:
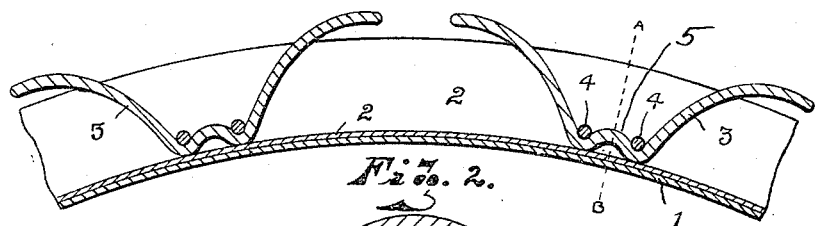
Fig. 2 is a similar view of the demountable metal rim, showing the spring members in place.

I prefer to construct the holding member or rim of two substantially U-shaped annular metal rings, 1 and 2, the inner one being considerably deeper than the outer one and having its flanges slightly converging for reasons hereinafter described.

The inner ring is designed to fit snugly within the outer ring and be suitably riveted or otherwise fastened thereto, which forms a strong substantial rim, that may be used as a demountable rim or to which the spokes of the wheel supporting same may be rigidly applied if preferred and thus form the felly of the wheel.

Within the inner ring 2 and resting upon the bottom thereof, are a plurality of outwardly extending diverging winged spring members 3, they being spaced equi-distant apart around the entire circumference of the rim. The tips of the wings of the springs are curved inwardly so as not to engage an encircling member abrasively, but to form as readily yieldable engagement therewith as possible. These springs are each held in place by two through bolts or pins 4—4 spaced apart around the rim, and resting upon the spring, the latter being arched outwardly intermediate the pins 4—4 forming a hump 5 which effectually prevents any longitudinal movement of the spring under the pins.

These pins preferably have countersunk heads within one of the outwardly extending flanges of the ring 1, and are screw threaded through the opposite flange and as security against accidental dislodgment, are designed to be slightly upset upon the threaded end after being screwed home.

Surrounding the springs 3 and slidably fitting intermediate the converging side flanges of the inner ring 2 is the metal sectional tire tread member, each arcuate section of which comprises the circumferential tread wall 6 and side walls 7—7. These sections are pivotally united or hinged together as at 8 forming a continuous yieldable tire member.

The hinges are formed by alternate portions 9 being cut from the abutting ends of the tread walls 6 of the sections and bent inwardly and back against the inner face of the wall and there securely attached in any desired manner, either by soldering or riveting and thus forming alined coöperating tubular sections through which the pin extends as any common hinge is formed.

Figure 3:
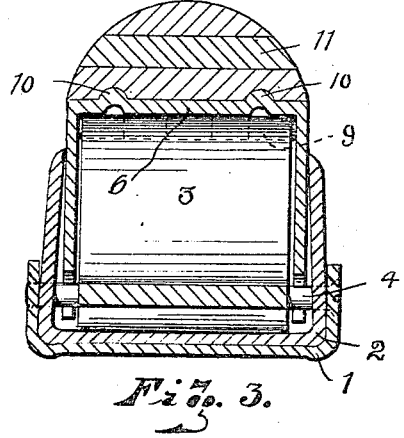
Fig. 3 is an enlarged transverse sectional view of the assembled tire through the center of one of the springs at a point indicated by the dotted line A—B, Fig. 2.

One or more circumferential beads 10 are formed upon the outer surface of the tire sections and are for the purpose of holding against lateral movement any desired form of resilient tread 11, such as hard rubber, or leather, and if the latter, it may be composed of a plurality of layers, as indicated in Fig. 3 of the drawings.

The inner face of the tread is provided with suitable grooves to register with the beads 10 and it may be otherwise fastened to the sectional tire if desired, such for example as by riveting.

The side walls 7—7 of the tire sections are of the proper depth to avoid contact with the floor wall of the ring 2 to provide for the entire impingement of the tire coming upon the free ends of the springs 3, and the central portion of each side wall 7 is cut out as at 12 to prevent the side walls engaging the pins 4 when reciprocating within the ring.

The ends of the side walls 7—7 of one section telescope the adjacent ends of the adjoining section, one pair being made to overlap the other, as clearly seen in Fig. 1, thus making as tight a joint as possible therebetween.

The object of having the flanges of the ring 2 converge outwardly, is to insure as nearly as possible at all times a tight joint between the outer edges thereof and the side walls 7—7 of the arcuate sections as they reciprocate therebetween. In this manner, dirt from the road is effectually prevented from entering the joint between the contacting walls. A certain amount of lateral rocking of the tread member is also permitted without opening the outer extremity of the joint.

Figure 4:
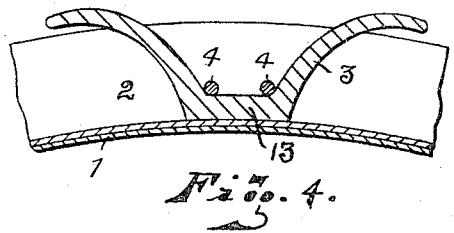
Fig. 4 is a sectional view of a modified form of spring member.

In Fig. 4, a modified form of spring member 3 is illustrated, it having a flat base portion 13 for keeping it in place in conjunction with the cross pins 4—4.

In the practical embodiment of my invention, I prefer to have one spring member 3 for each tire section though a greater number may be employed, and various other modifications falling within the scope of the invention may be resorted to without departing from the spirit thereof.

Having thus described my invention, what I claim and desire to secure by Letters Patent, is:

A wheel tire of the character described, comprising a substantially U-shaped rim, a plurality of winged springs within the rim and each having a hump therein between the wings, a pair of through pins, one on either side of the hump and fixed in the side walls of the rim, and a U-shaped tread member, composed of a plurality of arcuate sections hinged together, fitted within the U-shaped rim and resting wholly upon the wings of the springs.

In testimony whereof I hereunto affix my signature in the presence of two witnesses.

JOSEPH WEINBERG.

Witnesses:
H. L. LALLBERTE,
S. GEO. STEVENS.

Copies of this patent may be obtained for five cents each, by addressing the "Commissioner of Patents, Washington, D. C."